E. LANTZ.
RELEASABLE BEARING.
APPLICATION FILED MAR. 6, 1919.
1,327,285. Patented Jan. 6, 1920.
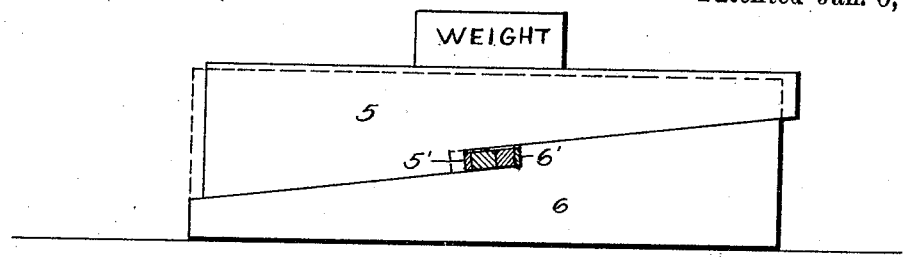
Fig. 1.
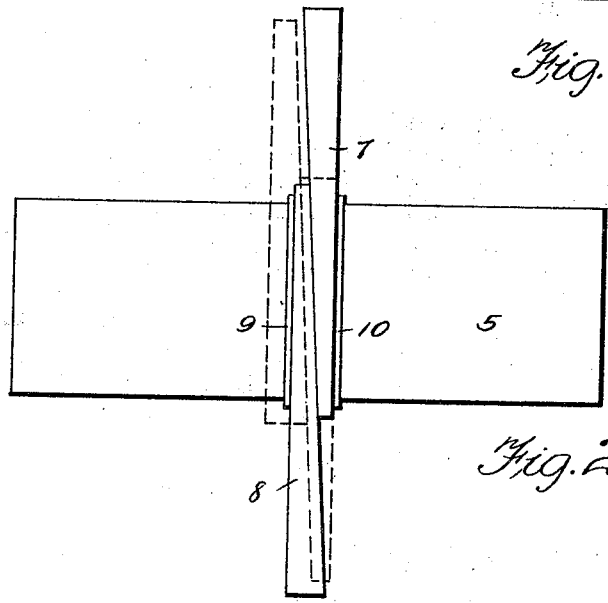
Fig. 2.
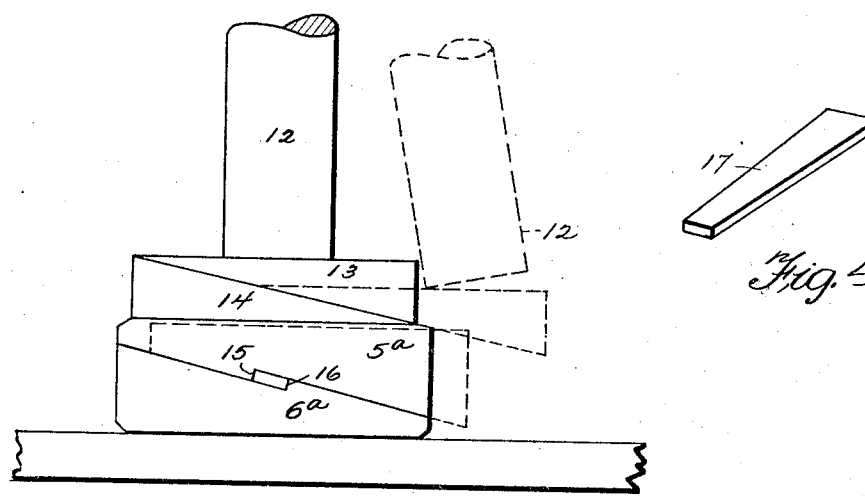
Fig. 3.
Fig. 4.
Witness
J. M. Lyles
Inventor
Eugene Lantz
By Shepherd & Campbell
Attorney

UNITED STATES PATENT OFFICE.

EUGENE LANTZ, OF JERSEY CITY, NEW JERSEY.

RELEASABLE BEARING.

1,327,285.

Specification of Letters Patent.

Patented Jan. 6, 1920.

Application filed March 6, 1919. Serial No. 280,938.

*To all whom it may concern:*

Be it known that I, EUGENE LANTZ, a citizen of the United States, residing at Jersey City, in the county of Hudson and State of New Jersey, have invented certain new and useful Improvements in Releasable Bearings, of which the following is a specification.

This invention relates to releasable bearings and it has for its object the provision of a structure adapted to firmly and securely support a very considerable weight any desired length of time and capable of thereafter being easily and quickly removed from supporting position. Devices of this nature are useful in many relations as, for example, for supporting ship-way keel cribbing or the shoring under the hulls of vessels under construction, in the repairing or underpinning of foundations and in many other relations which will readily suggest themselves to those having use for a structure of this nature. Briefly stated, my improved releasable bearing comprises a pair of wedge shaped pieces the inclined faces of which lie in contact with each other, the upper face of one wedge lying parallel with the lower face of the other wedge and these upper and lower faces preferably lying in a substantially horizontal plane.

The inclined abutting faces of the wedges are not continuous throughout their length but, upon the contrary, each of these faces is interrupted to form an abrupt shoulder, these shoulders co-acting with transversely operating wedge shaped keys in a manner which will be presently set forth.

In the accompanying drawings in which like characters of reference designate corresponding parts, Figure 1 is a side elevation of a bearing construction in accordance with the invention, Fig. 2 is a plan view thereof, Fig. 3 is a side elevation of a modified form of the invention, and Fig. 4 is a perspective view of a key hereinafter described.

Referring to the drawing and particularly to Figs. 1 and 2, 5 designates an upper wedge and 6 a lower wedge, the abutting faces of which are stepped to form a shoulder 5' upon the wedge 5 and a shoulder 6' upon the wedge 6. Transversely operating wedge shaped keys 7 and 8 are adapted to operate within the space formed between the shoulders 5' and 6' and I preferably employ metallic bearing plates 9 and 10 which not only serve to protect the shoulders and to keep the wedges in good shape, but, since they may be smooth and polished, reduce friction at the time when the keys 7 and 8 are being driven inwardly to force the wedge 5 endwise with respect to the wedge 6 to thereby lower the wedge 5 to the dotted line position illustrated in Fig. 1 and to thereby release the bearing from the support of a structure indicated by the weight 11, which may represent the keel of a ship of many tons' weight.

I have found that this structure is so efficient in use that with less than six blows with a hammer the wedge 5 may be started from beneath a weight of fifty tons and my experience with this structure convinces me that it is capable of being removed from beneath a weight much greater than that named. Furthermore, I find that the keys may be backed out at any time with blows from a small nail hammer even after they have been subjected to heavy blows with a twelve pound hammer.

While I have chosen to illustrate two keys 7 and 8, this structure is operable with a single key in this location, it being manifest that it would only be necessary to properly shape one of the shoulders, 6' for example, to accomplish this end.

In the form of the invention illustrated in Fig. 3 I have provided a structure serving as a support for the shoring 12 of a ship's hull. In this case the shoring is supported upon wedges 13 and 14 and these are in turn supported upon wedges 5$^a$ and 6$^a$ which correspond substantially to the wedges 5 and 6. These wedges are provided with shoulders 15 and 16 adapted to receive a key 17 between them. As long as this key is in position the shoring 12 will be strongly supported but when the key 17 is driven out of its place the wedge 5$^a$ is permitted to move to the dotted line position illustrated in Fig. 3 which lowers the upper surface of the same and relieves the pressure upon the wedges 13 and 14 to such an extent that the shoring and wedge 13 may be easily moved to the dotted line position shown in said Fig. 3 and, if the inclination of the abutting faces of the wedges 13 and 14 is sharp enough, the wedge 13 will fall out of place when the key 17 is removed.

While the elements shown and described are well adapted to serve the purposes for which they are intended it is to be understood that the invention is not limited to the precise construction set forth but that it includes within its purview whatever changes fairly come within either the terms or the spirit of the appended claims.

Having described my invention, what I claim is:

1. A releasable bearing comprising a pair of wedges, the inclined faces of which lie in contact with each other, each being stepped to provide a shoulder, and a laterally acting wedge shaped key co-acting with said shoulders.

2. A releasable bearing comprising a pair of wedges the inclined faces of which lie in contact with each other, each being stepped to provide a shoulder, a laterally acting wedge shaped key disposed between said shoulders, the shoulder of the upper wedge lying at that side of the key toward the thinner end of the upper wedge, and the shoulder of the lower wedge lying at that side of the key toward the thinner end of the lower wedge, whereby when the key is driven inwardly the upper wedge is moved upwardly over the inclined face of the lower wedge.

3. A structure as recited in claim 2 in combination with a pair of wedges supported upon the first named wedges and having inclined abutting faces and substantially horizontal and parallel upper and lower faces, respectively.

In testimony whereof I affix my signature.

EUGENE LANTZ.